United States Patent
Kim (10) Patent No.: US 12,417,048 B2
(45) Date of Patent: Sep. 16, 2025

(54) CONTROLLER CAPABLE OF ADJUSTING SYSTEM TEMPERATURE, STORAGE DEVICE INCLUDING THE CONTROLLER, AND METHOD OF OPERATING THE STORAGE DEVICE

(71) Applicant: SK hynix Inc., Icheon (KR)

(72) Inventor: Chi Eun Kim, Icheon (KR)

(73) Assignee: SK hynix Inc., Icheon (KR)

( * ) Notice: Subject to any disclaimer, the term of this patent is extended or adjusted under 35 U.S.C. 154(b) by 52 days.

(21) Appl. No.: 18/190,810

(22) Filed: Mar. 27, 2023

(65) Prior Publication Data

US 2024/0152291 A1 May 9, 2024

(30) Foreign Application Priority Data

Nov. 9, 2022 (KR) .................. 10-2022-0148464

(51) Int. Cl.
*G06F 3/06* (2006.01)

(52) U.S. Cl.
CPC .......... *G06F 3/0647* (2013.01); *G06F 3/0619* (2013.01); *G06F 3/0683* (2013.01)

(58) Field of Classification Search
CPC .... G06F 3/0647; G06F 3/0619; G06F 3/0683; G06F 3/0649; G06F 3/0679
See application file for complete search history.

(56) References Cited

U.S. PATENT DOCUMENTS

| | | | | |
|---|---|---|---|---|
| 10,685,719 | B2 * | 6/2020 | Lee | G11C 16/26 |
| 11,853,599 | B2 * | 12/2023 | Nakano | G06F 11/3037 |
| 2011/0271048 | A1 * | 11/2011 | Fuji | G06F 11/1441 |
| | | | | 711/E12.019 |
| 2014/0281311 | A1 * | 9/2014 | Walker | G06F 3/0631 |
| | | | | 711/170 |
| 2018/0158492 | A1 * | 6/2018 | Lee | G11C 11/5628 |
| 2020/0358478 | A1 * | 11/2020 | Shirsat | H02J 50/20 |
| 2020/0394114 | A1 * | 12/2020 | Lee | G06F 12/0246 |
| 2021/0020231 | A1 * | 1/2021 | Deng | G11C 11/40611 |

FOREIGN PATENT DOCUMENTS

| | | |
|---|---|---|
| KR | 1020180069177 A | 6/2018 |
| KR | 1020180081989 A | 7/2018 |
| KR | 1020200143107 A | 12/2020 |

* cited by examiner

*Primary Examiner* — Tasnima Matin (57) ABSTRACT

A storage device may migrate data stored in a partial data area of a volatile memory to a nonvolatile memory depending on a system temperature, and may deactivate the corresponding data area, whereby it is possible to variably adjust data areas on which a refresh operation is performed in the volatile memory. Since data areas on which a refresh operation is performed are adjusted depending on a system temperature, a storage device capable of adjusting the system temperature and preventing performance and reliability from degrading according to the system temperature may be provided.

18 Claims, 10 Drawing Sheets

CONTROLLER CAPABLE OF ADJUSTING SYSTEM TEMPERATURE, STORAGE DEVICE INCLUDING THE CONTROLLER, AND METHOD OF OPERATING THE STORAGE DEVICE

CROSS-REFERENCE TO RELATED APPLICATION

The present application claims priority under 35 U.S.C. § 119(a) to Korean Patent Application No. 10-2022-0148464 filed in the Korean Intellectual Property Office on Nov. 9, 2022, which is incorporated herein by reference in its entirety.

BACKGROUND

1. Technical Field

Various embodiments generally relate to a controller capable of adjusting a system temperature, a storage device including the controller, and a method of operating the storage device.

2. Related Art

A storage device is a device which stores data in response to a request of a host such as a computer, a mobile terminal such as a smartphone or a tablet, or any of various electronic devices.

The storage device may include a controller for controlling a memory (e.g., a volatile memory/a nonvolatile memory). The controller may receive a command from the host, and may execute or control an operation for reading, writing, or erasing data with respect to the memory included in the storage device in response to the received command.

As the storage device operates, a temperature of the storage device may increase. As the temperature of the storage device increases, performance of the storage device may degrade, or reliability of data stored in the storage device may degrade.

SUMMARY

Various embodiments are directed to providing an apparatus and a method capable of preventing degradation in performance or reliability of a storage device due to an increase in a temperature of the storage device.

In an embodiment, a storage device may include: a nonvolatile memory; a volatile memory including a plurality of data areas on at least a part of which a refresh operation is periodically performed; and a controller configured to, when a system temperature changes from a first temperature to a second temperature higher than the first temperature, store data stored in a first data area of the volatile memory in a first temporary area of the nonvolatile memory and deactivate the first data area.

In an embodiment, a storage device may include: a nonvolatile memory; a volatile memory including a plurality of data areas on at least a part of which a refresh operation is periodically performed; and a controller configured to, when a system temperature changes from a first temperature to a second temperature lower than the first temperature, activate at least a par of data areas which are deactivated among the plurality of data areas when the system temperature is the first temperature.

In an embodiment, a storage device may include: a nonvolatile memory; a volatile memory including a plurality of data areas on at least a part of which a refresh operation is periodically performed; and a controller configured to monitor a system temperature, set at least one of the plurality of data areas as a target data area depending on the system temperature, and adjust an activated or deactivated state of the target data area.

In an embodiment, a storage device may include: a nonvolatile memory; a volatile memory including a plurality of data areas on at least a part of which a refresh operation is periodically performed; and a controller configured to, when a system temperature is equal to or higher than a first threshold temperature, store data stored in a first data area among the plurality of data areas in a first temporary area of the nonvolatile memory and deactivate the first data area.

In an embodiment, a method for operating a storage device may include: storing, when a system temperature is equal to or higher than a threshold temperature, data stored in a target data area among a plurality of data areas of a volatile memory in a temporary area of a nonvolatile memory; and deactivating the target data area.

In an embodiment, a controller may include: a volatile memory configured to compare a system temperature with at least one preset threshold temperature; and a processor configured to, when the system temperature is equal to or higher than the at least one threshold temperature, store data stored in a partial data area of the volatile memory in an outside and deactivate the partial data area of the volatile memory.

According to the embodiments of the disclosed technology, by adjusting the temperature of the storage device even when the temperature of the storage device increases, it is possible to maintain performance and reliability of the storage device.

DETAILED DESCRIPTION

Hereinafter, embodiments of the disclosed technology will be described in detail with reference to the accompanying drawings.

Figure 1:
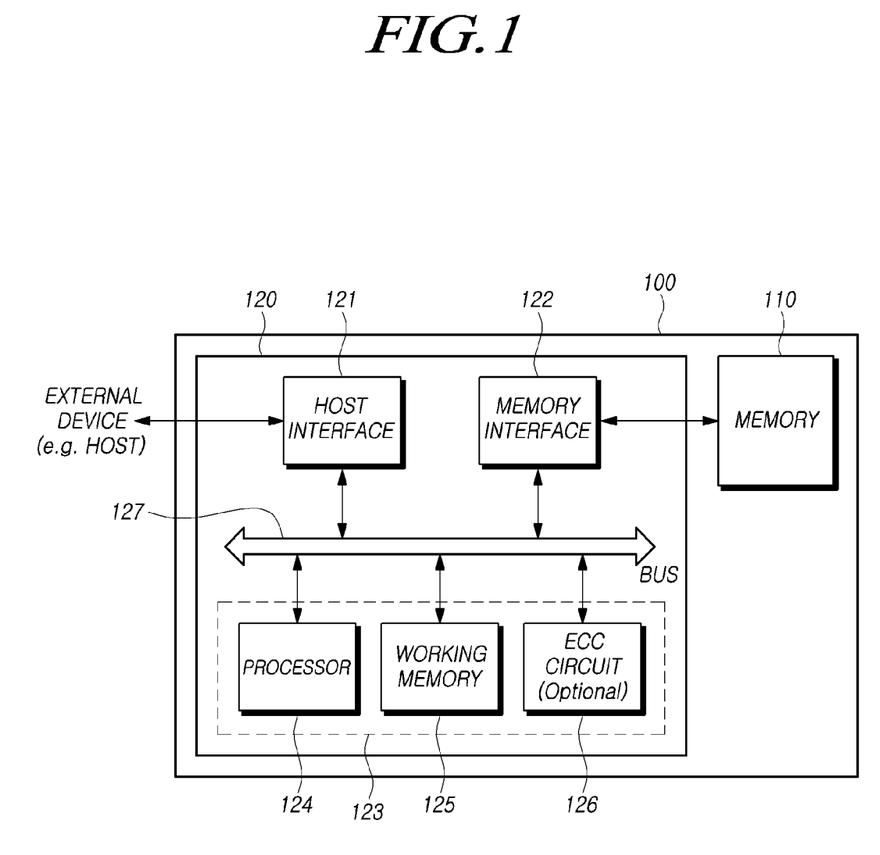
FIG. 1 illustrates a storage device according to an embodiment of the disclosed technology.

FIG. 1 illustrates a storage device 100 according to an embodiment of the disclosed technology.

Referring to FIG. 1, the storage device 100 may include a memory 110 for storing data, and a controller 120 for controlling the memory 110.

The memory 110 may include a plurality of memory blocks, and operate under the control of the controller 120. Operations of the memory 110 may include a read operation, a program operation (also referred to as a write operation) and an erase operation.

The memory 110 may include a memory cell array including a plurality of memory cells (also simply referred to as "cells") which store data. Such a memory cell array may exist in a memory block.

For example, the memory 110 may be implemented into various types such as a NAND flash memory, a 3D NAND flash memory, a NOR flash memory, a resistive random access memory (RRAM), a phase-change random access memory (PRAM), a magneto-resistive random access memory (MRAM), a ferroelectric random access memory (FRAM), and a spin transfer torque random access memory (STT-RAM).

The memory 110 may be implemented into a three-dimensional array structure. The embodiment of the disclosed technology may be applied to not only a flash memory in which a charge storage layer is configured by a conductive floating gate but also a charge trap flash (CTF) in which a charge storage layer is configured by a dielectric layer.

The memory 110 may receive a command and an address from the controller 120, and may access an area which is selected by the address in the memory cell array. In other words, the memory 110 may perform an operation, indicated by the command, on the area selected by the address.

For example, the memory 110 may perform a program operation, a read operation, and an erase operation. In this connection, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (or program), read, erase, and background operations for the memory 110. For example, the background operation may include at least one among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. Also, the controller 120 may control the operation of the memory 110 regardless of a request of the host.

The host may be any of a computer, an ultra-mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices which are separated from each other. As the case may be, the controller 120 and the host may be integrated into one device. Hereunder, for the sake of convenience in explanation, it will be described as an example that the controller 120 and the host are devices which are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface which uses at least one among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 under the control of the control circuit 123.

The control circuit 123 performs the general control operation of the controller 120 to control the operation of the memory 110. To this end, for instance, the control circuit 123 may include at least one of a processor 124 and a working memory 125, and may selectively include an error detection and correction circuit (ECC circuit) 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA), by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host, by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110, by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive)

firmware loaded in the working memory 125 upon booting. Hereafter, an operation of the storage device 100 to be described based on the embodiment of the disclosed technology may be implemented in such a way that the processor 124 executes firmware in which the corresponding operation is defined.

Firmware, as a program to be executed in the storage device 100 to drive the storage device 100, may include various functional layers. For example, the firmware may include binary data in which is codes for executing the functional layers, respectively, are defined.

For example, the firmware may include at least one among a flash translation layer (FTL) which performs a translating function between a logical address requested to the storage device 100 from the host and a physical address of the memory 110, a host interface layer (HIL) which serves to analyze a command requested to the storage device 100 from the host and transfer the command to the flash translation layer (FTL), and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 to generate a command or a signal, according to a result of performing the logic calculation defined in the firmware. When a part of firmware in which a logic calculation to be performed is defined is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data which are necessary to drive the controller 120. Such a working memory 125 as, for example, a volatile memory, may include at least one among an SRAM (static RAM), a DRAM (dynamic RAM) and an SDRAM (synchronous DRAM).

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using the error correction code. The error detection and correction circuit 126 may be implemented by various code decoders. For example, a decoder which performs unsystematic code decoding or a decoder which performs systematic code decoding may be used.

For example, the error detection and correction circuit 126 may detect an error bit by the unit of a set sector in each of read data. Namely, each read data may be constituted by a plurality of sectors. A sector may mean a data unit smaller than a page being the read unit of a flash memory. Sectors constituting each read data may be matched with one another by the medium of an address.

The error detection and correction circuit 126 may calculate a bit error rate (BER), and may determine whether an error is correctable or not, by the unit of a sector. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. When a sector included in read data is correctable, the error detection and correction circuit 126 may omit an error detection and correction operation for a corresponding sector for next read data. When the error detection and correction operation for all read data is ended in this way, the error detection and correction circuit 126 may detect a sector which is determined to be uncorrectable to the last. There may be one or more sectors that are determined to be uncorrectable. The error detection and correction circuit 126 may transfer information (e.g., address information) on a sector which is determined to be uncorrectable, to the processor 124.

A bus 127 may be configured to provide channels among the components 121, 122, 124, 125, and 126 of the controller 120. The bus 127 may include, for example, a control bus for transferring various control signals, commands and the likes, a data bus for transferring various data, and so forth.

Some components among the above-described components 121, 122, 124, 125, and 126 of the controller 120 may be omitted, or some components among the above-described components 121, 122, 124, 125, and 126 of the controller 120 may be integrated into one component. As the case may be, in addition to the above-described components 121, 122, 124, 125, and 126 of the controller 120, one or more other components may be added.

During an operation of the memory 110 and the storage device 100 including the memory 110, a temperature of the storage device 100 may increase. When the temperature of the storage device 100 increases, performance and reliability of the storage device 100 may degrade.

Embodiments of the disclosed technology may provide an apparatus and a method capable of maintaining the performance and the reliability of the storage device 100 by adjusting the temperature of the storage device 100 when the temperature of the storage device 100 increases.

Figure 2:
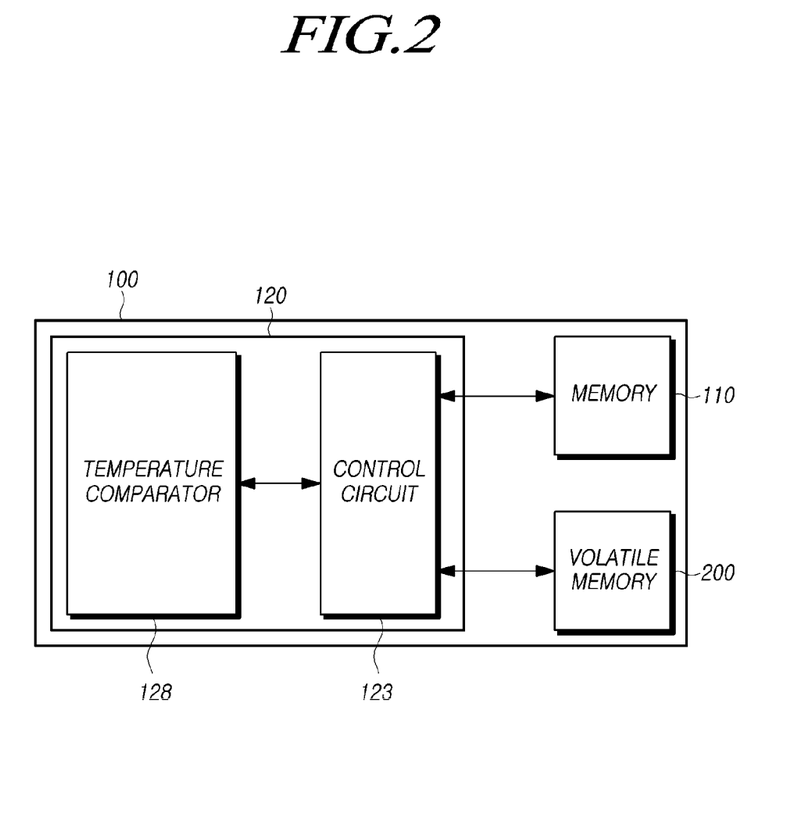
FIG. 2 illustrates a storage device according to another embodiment of the disclosed technology.

FIG. 2 illustrates a storage device 100 according to another embodiment of the disclosed technology. FIGS. 3 to 7 illustrate an operating scheme of the storage device 100 illustrated in FIG. 2 according to an embodiment of the disclosed technology.

Referring to FIG. 2, the storage device 100 may include a memory 110, a controller 120, and a volatile memory 300.

The memory 110 may be a nonvolatile memory.

The controller 120 may include at least some of the components described above with reference to FIG. 1. The controller 120 may include a control circuit 123 and a temperature comparator 128.

The volatile memory 200 may be one of memories which are located inside the storage device 100.

The volatile memory 200 may be located inside the controller 120 or outside the controller 120.

When the volatile memory 200 is located inside the controller 120, the volatile memory 200 may be the working memory 125 illustrated in FIG. 1. Alternatively, the volatile memory 200 may be another memory which is included in the controller 120 in addition to the working memory 125.

The temperature comparator 128 may compare a system temperature with at least one preset threshold temperature. The system temperature may be a temperature of the storage device 100. The system temperature may be a temperature of at least one component included in the storage device 100. Therefore, the system temperature may be a temperature of at least one of the memory 110, the controller 120, and the volatile memory 200.

Based on a comparison result of the temperature comparator 128, the control circuit 123 may perform an operation for adjusting the system temperature. In an embodiment, the operation for adjusting the system temperature may be performed by a processor included in the control circuit 123, e.g., the processor 124 illustrated in FIG. 1.

For example, when the system temperature is equal to or higher than the threshold temperature, the controller 120 may delay and/or stop a certain operation of the storage device 100.

For example, the controller 120 may delay a background operation. Alternatively, the controller 120 may delay processing of a command inputted from a host.

When the system temperature is equal to or higher than the threshold temperature, the controller 120 may stop some control operations to be performed on the volatile memory 200.

For example, when the system temperature is equal to or higher than the threshold temperature, the controller 120 may designate a certain data area among a plurality of data areas included in the volatile memory 200 as a target data area.

The controller 120 may migrate data stored in the target data area of the volatile memory 200 to the memory 110.

When the data stored in the target data area of the volatile memory 200 is stored in the memory 110, the controller 120 may deactivate the target data area of the volatile memory 200.

When the target data area of the volatile memory 200 is deactivated, a refresh operation on the target data area may be stopped. That is, the refresh operation may not be performed on the target data area.

The refresh operation may be periodically performed to prevent data stored in memory cells of the volatile memory 200 from being damaged by a leakage current. Since the data stored in the target data area is migrated to and stored in the memory 110, the refresh operation on the target data area may be stopped. However, the refresh operation may be periodically performed on data areas other than the target data area.

When the system temperature is equal to or higher than the threshold temperature, by stopping performing the refresh operation on the target data area, it is possible to reduce the system temperature or reduce a degree of increase in the system temperature.

For example, when the system temperature increases from a first temperature to a second temperature higher than the first temperature, the size (or number) of data areas on which the refresh operation is performed in the volatile memory 200 may decrease. The size of data areas on which the refresh operation is performed at the second temperature may be smaller than the size of data areas on which the refresh operation is performed at the first temperature.

When the system temperature increases from the second temperature to a third temperature higher than the second temperature, the size of data areas on which the refresh operation is performed in the volatile memory 200 may further decrease. That is, as the system temperature increases, the size of data areas on which the refresh operation is performed may gradually decrease.

Since the data stored in the target data area is migrated to and stored in the memory 110, the controller 120 should read the data from the memory 110 when the data is required to perform a necessary operation relating to the data.

In this way, when the system temperature increases, the controller 120 may adjust the system temperature by delaying a certain operation and/or stopping performing a refresh operation on some data areas of the volatile memory 200.

The operation of delaying the certain operation and/or the operation of stopping performing the refresh operation on some data areas may be performed according to the same standard or may be performed according to different standards.

In an embodiment, when the system temperature is equal to or higher than the threshold temperature, the controller 120 may delay the certain operation of the storage device 100 and simultaneously stop performing the refresh operation on some data areas of the volatile memory 200.

In another embodiment, when the system temperature is equal to or higher than a reference temperature lower than the threshold temperature, but is lower than the threshold temperature, the controller 120 may delay the certain operation of the storage device 100. When the system temperature is equal to or higher than the threshold temperature, the controller 120 may stop performing the refresh operation on some data areas.

In still another embodiment, in order to adjust the system temperature, the controller 120 may delay the certain operation of the storage device 100 or stop performing the refresh operation on some data areas.

The controller 120 may select a certain data area, as the target data area on which the refresh operation is not performed, in consideration of data stored in the certain data area.

In an embodiment, a data area storing data, which has a relatively small influence on a system operation even when being migrated to and stored in the memory 110, among data stored in the volatile memory 200, may be selected as the target data area.

In another embodiment, a data area, which has a longest elapse time after data stored in the data area has been updated, among the plurality of data areas included in the volatile memory 200 may be selected as the target data area.

In still another embodiment, a data area, which has the smallest number of data updating times for a preset time period (referred to as a "data updating count value"), among the plurality of data areas included in the volatile memory 200, may be selected as the target data area.

In further still another embodiment, a data area, which stores data having a low use frequency or being temporarily not used, may be selected as the target data area.

Besides, the target data area may be selected in various ways in consideration of characteristics of stored data.

In an embodiment, the target data area may be one of a set of data areas in the volatile memory 200, and the set of data areas are physically distinguished from each other.

In another embodiment, the target data area may be one of a set of data areas in the volatile memory 200, and the set of data areas are distinguished from each other according to attributes (e.g., Map, Log, etc.) of data stored therein. According to an attribute of data, a data area storing data that has an attribute of a low use frequency may be selected as the target data area.

When the system temperature becomes lower than the threshold temperature after the target data area has been deactivated, the controller 120 may activate the deactivated target data area. If necessary, the controller 120 may migrate the data, which has been migrated to and stored in the memory 110, to the target data area again.

For example, when the system temperature decreases from a first temperature to a second temperature lower than the first temperature, at least some of the data areas of the volatile memory 200 which have been deactivated when the system temperature was the first temperature may be activated. A refresh operation may be periodically performed on a data area activated at the second temperature. The size of data areas on which the refresh operation is periodically performed in the volatile memory 200 when the system temperature is the first temperature may be equal to or smaller than the size of data areas on which the refresh operation is periodically performed in the volatile memory 200 when the system temperature is the second temperature.

When the system temperature decreases from the second temperature to a third temperature lower than the second temperature, the size of data areas on which the refresh operation is performed in the volatile memory 200 may further increase. That is, as the system temperature decreases, the size of data areas on which the refresh operation is performed may gradually increase. The size of data areas which are deactivated and thus on which the refresh operation is not performed may decrease as the system temperature decreases.

Since the controller 120 selectively performs the refresh operation on some data areas of the volatile memory 200 according to the system temperature, the system temperature of the storage device 100 may be easily adjusted, and thus it is possible to prevent the performance or reliability of the storage device 100 from degrading due to an increase in the system temperature of the storage device 100.

The aforementioned control operation may be performed by the control circuit 123 included in the controller 120, e.g., by the processor 124 in the control circuit 123, but embodiments are not limited thereto.

The controller 120 may control the refresh operation based on one threshold temperature, or may control the refresh operation based on at least two threshold temperatures.

FIGS. 3 to 7 illustrate an operating scheme of the storage device 100 illustrated in FIG. 2.

Figure 3:
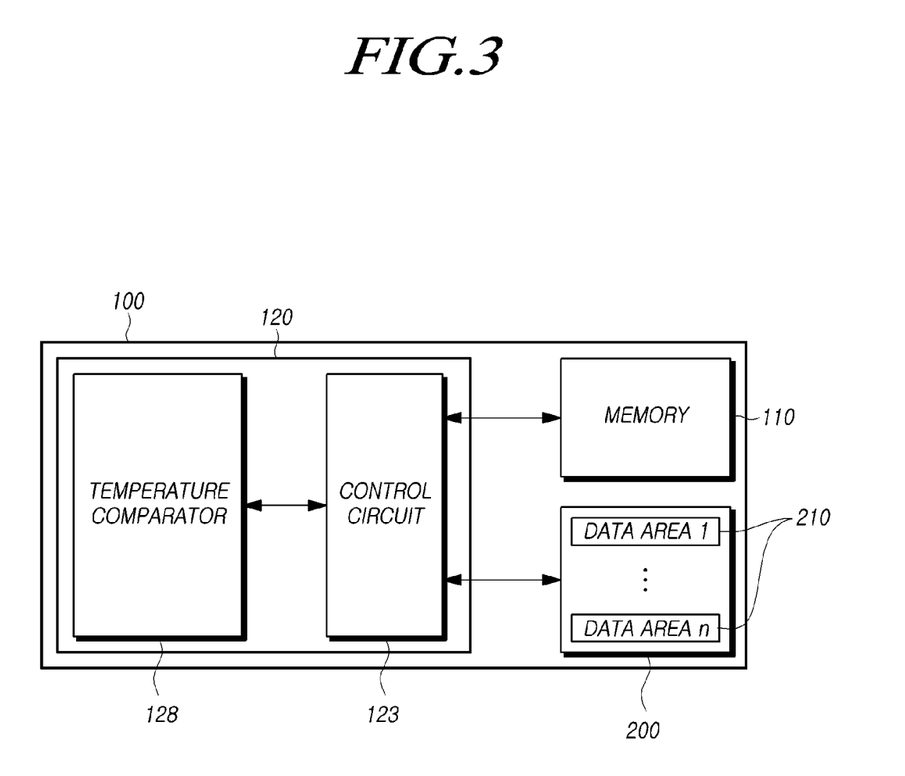
FIGS. 3 to 7 illustrate an operating scheme of the storage device illustrated in FIG. 2.

Referring to FIG. 3, the storage device 100 may include the volatile memory 200. The volatile memory 200 may include a plurality of data areas 210. The plurality of data areas 210 may be physically distinguished from each other. Alternatively, the plurality of data areas 210 may be distinguished from each other according to attributes of data to be stored therein.

The storage device 100 may include the memory 110 and the controller 120. The controller 120 may include the temperature comparator 128 and the control circuit 123.

The temperature comparator 128 may compare the system temperature with at least one preset threshold temperature.

The temperature comparator 128 may measure, as the system temperature, a temperature of at least one of the components included in the storage device 100, e.g., a temperature of at least one of the memory 110, the controller 120, and the volatile memory 200, using a sensor. Alternatively, the temperature comparator 128 may receive the system temperature from the outside.

The control circuit 123 may adjust the system temperature based on a temperature comparison result of the temperature comparator 128.

Figure 4:
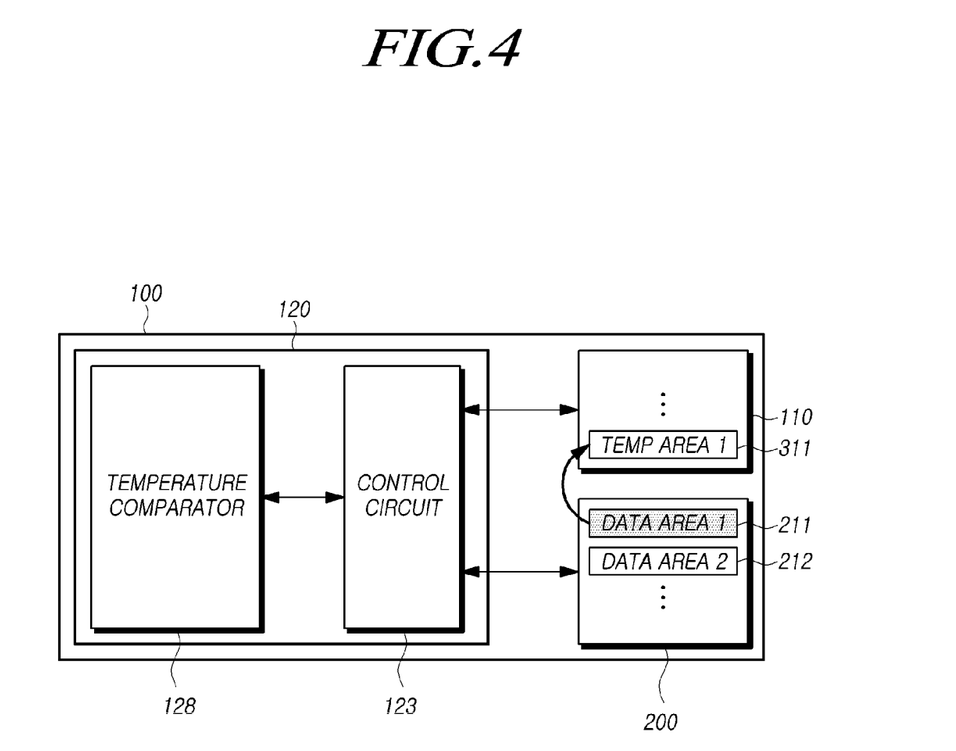

For example, referring to FIG. 4, when the system temperature is equal to or higher than a first threshold temperature, the control circuit 123 may select a target data area among the plurality of data areas 210 included in the volatile memory 200. For example, a data area which stores data having the lowest use frequency may be selected as the target data area.

FIG. 4 illustrates a case where a first data area 211 among the plurality of data areas 210 included in the volatile memory 200 is selected as the target data area.

The control circuit 123 may migrate data stored in the first data area 211 to a first temporary area 311 of the memory 110. The first temporary area 311 may be a free block in the memory 110, the free block storing no data. Alternatively, the first temporary area 311 may be a part of an area in which data is not stored, among areas of the memory 110 that are allocated to store information necessary for controlling the storage device 100.

The control circuit 123 may deactivate the first data area 211 after migrating the data stored in the first data area 211 to the first temporary area 311. The control circuit 123 may manage information on the physical location of the first data area 211 in the volatile memory 200. For example, the control circuit 123 may manage mapping information between the physical location of the first data area 211 and the physical location of the first temporary area 311. The aforementioned information, e.g., the mapping information, may be stored in a working memory included in the control circuit 123, e.g., the working memory 125 shown in FIG. 1. The aforementioned information may be retained during a period in which the first data area 211 is deactivated.

The control circuit 123 may stop performing a refresh operation on the first data area 211 when the first data area 211 is deactivated. As the case may be, the control circuit 123 may delete the data stored in the first data area 211.

Although the refresh operation performed on the first data area 211 is stopped, a refresh operation on a second data area 212 that is still activated may be periodically performed.

Since the total number of refresh operations performed in the volatile memory 200 decreases, the system temperature may decrease or a degree of increase in the system temperature may decrease.

Thereafter, the temperature comparator 128 may continuously or periodically perform a comparison between the system temperature and the first threshold temperature.

The temperature comparator 128 may perform a comparison between the system temperature and a second threshold temperature that is higher than the first threshold temperature.

Figure 5:
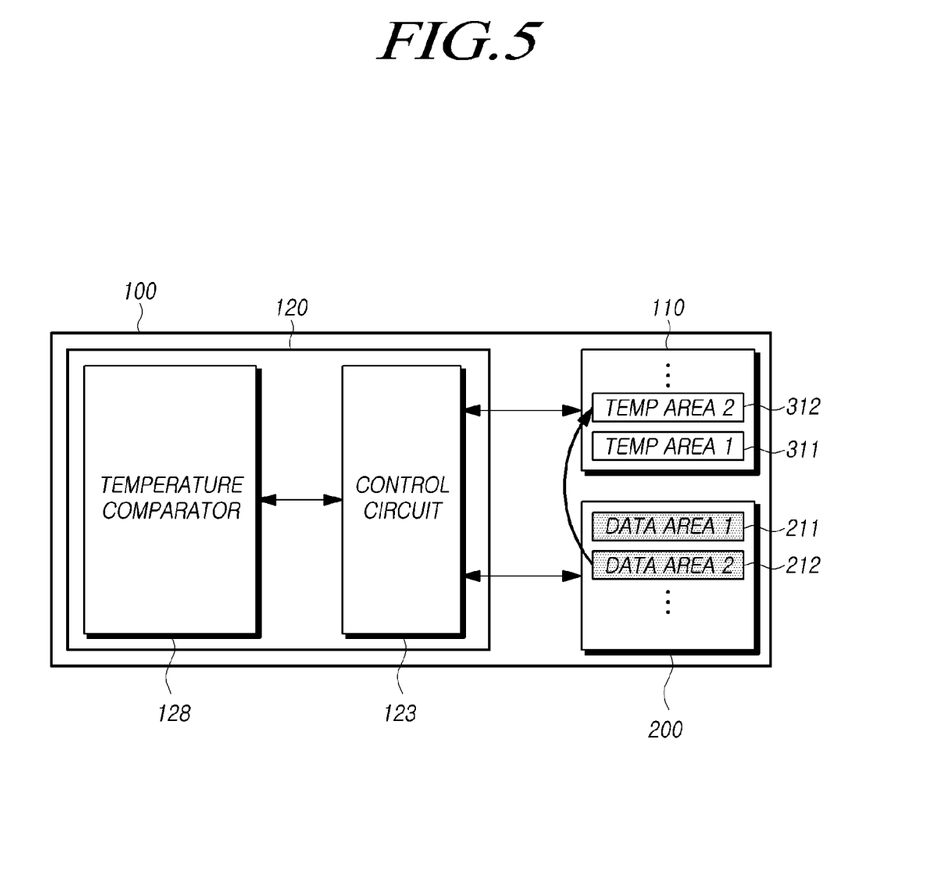

Referring to FIG. 5, after the first data area 211 is deactivated, when the system temperature is equal to or higher than the second threshold temperature, the control circuit 123 may further select the second data area 212 among the plurality of data areas 210 included in the volatile memory 200, as a target data area. The second data area 212 may be in the same memory block as the first data area 211 or in a different memory block from the first data area 211. The second data area 212 may be selected as the target data area according to the same standard as the standard for selecting the first data area 211 as the target data area.

The control circuit 123 may migrate data stored in the second data area 212 to a second temporary area 312 of the memory 110. The second temporary area 312 may be a free block in the memory 110. The second temporary area 212 may be in the same memory block as the first temporary area 211 or in a different memory block from the first temporary area 211.

The control circuit 123 may deactivate the second data area 212 after the data stored in the second data area 212 is migrated to the second temporary area 312. A refresh operation performed on the second data area 212 may be stopped when the second data area 212 deactivated. As the case may be, the data stored in the second data area 212 may be deleted. The control circuit 123 may manage information on the physical location of the second data area 212, e.g., mapping information between the physical location of the second data area 212 and the physical location of the second temporary area 312 while the second data area 212 is deactivated.

As the system temperature becomes equal to or higher than the second threshold temperature that is higher than the first threshold temperature, the number of data areas on which a refresh operation is not performed in the volatile memory 200 may be increased.

The second data area 212 may be selected according to the use frequency of data stored therein.

For example, the second data area 212 may be a data area whose elapse time after the latest updating of the stored data is shorter than an elapse time after the latest updating of the first data area 211. The second data area 212 may have the elapse time after the latest updating that is longer than elapse times of the remaining data areas 210 other than the first data area 211.

Alternatively, the second data area 212 may be a data area whose data updating count value for a preset time period is greater than a data updating count value of the first data area 211 for the preset time period. The data updating count value of the second data area 212 may be smaller than data updating count values of the remaining data areas 210 for the preset time period.

The second data area 212 may store data having a use frequency that is higher than a use frequency of the data stored in the first data area 211 and lower than use frequencies of data stored in the remaining data areas 210.

The size of the second data area 212 may be the same as that of the first data area 211. Alternatively, the size of the second data area 212 may be larger than that of the first data area 211. As the system temperature increases, a degree of increase in the number of deactivated data areas may increase.

As such, the control circuit 123 may control the size of data areas to be deactivated in the volatile memory 200 based on at least two threshold temperatures. The control circuit 123 may increase the number of data areas to be deactivated by comparing the system temperature and a third threshold temperature higher than the second threshold temperature.

The control circuit 123 may delay a certain operation of the storage device 100 simultaneously with or separately from deactivating some of the data areas 210 of the volatile memory 200.

In an embodiment, when the system temperature is lower than the first threshold temperature and is equal to or higher than a reference temperature, the control circuit 123 may delay at least one of a background operation and a processing of a command inputted from the host.

In another embodiment, when the system temperature is equal to or higher than the first threshold temperature, the control circuit 123 may delay at least one of a background operation and a processing of a command inputted from the host.

In still another embodiment, when the system temperature is equal to or higher than the first threshold temperature, the control circuit 123 may deactivate a certain data area in the volatile memory 200. When the system temperature is equal to or higher than the second threshold temperature, the control circuit 123 may delay at least one of a background operation and a processing of a command inputted from the host in addition to deactivating the certain data area. That is, when the system temperature is equal to or higher than the second threshold temperature higher than the first threshold temperature, the control circuit 123 may delay the certain operation and deactivate the certain data area of the volatile memory 200.

The delaying of the background operation and the delaying of the processing of the command inputted from the host are examples. The control circuit 123 may delay at least a certain operation among operations other than a refresh operation according to the system temperature.

After the first data area 211 and the second data area 212 of the volatile memory 200 are deactivated, the control circuit 123 may activate at least one of the deactivated first and second data areas 211 and 212 again according to a change in the system temperature.

Figure 6:
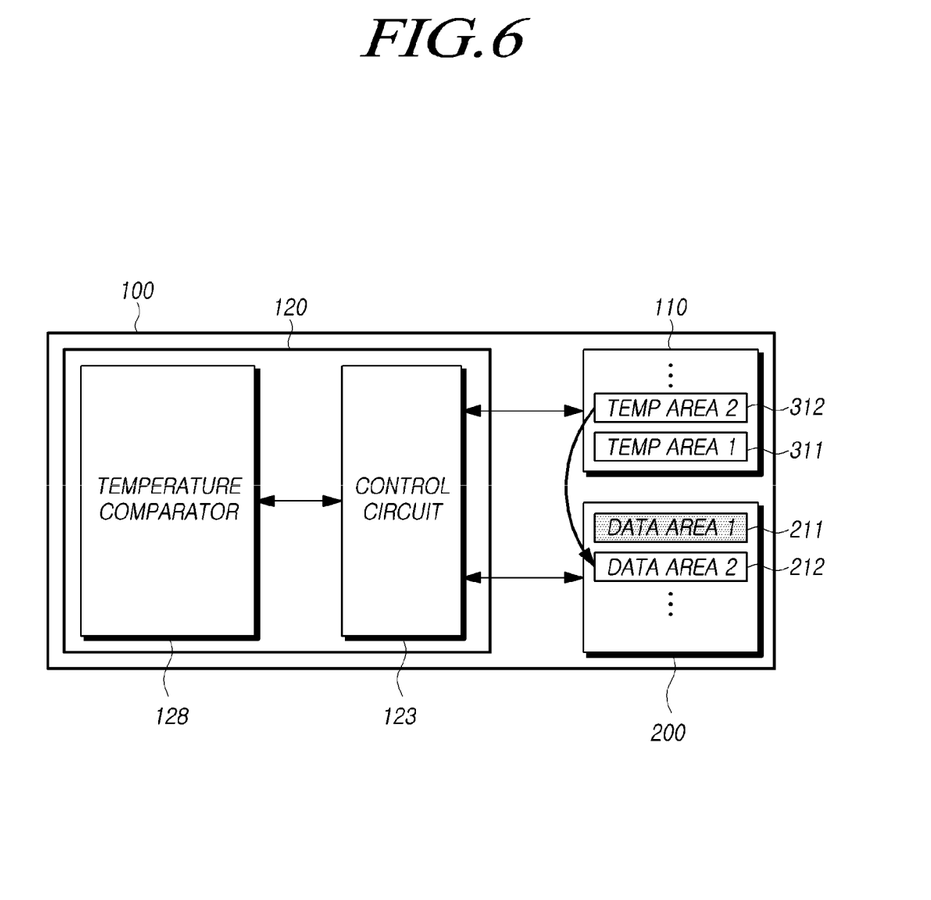

Referring to FIG. 6, after the first data area 211 and the second data area 212 are deactivated, the system temperature may become equal to or higher than the first threshold temperature and lower than the second threshold temperature.

When the system temperature becomes lower than the second threshold temperature, the control circuit 123 may activate the second data area 212 of the volatile memory 210 so that the second data area 212 is changed to a state capable of storing data. Thus, a refresh operation may be periodically performed on the second data area 212.

As the case may be, the control circuit 123 may migrate the data stored in the second temporary area 312 of the memory 110 to the second data area 212.

Since the system temperature is lower than the second threshold temperature and is equal to or higher than the first threshold temperature, the control circuit 123 may activate the second data area 212, and may maintain the first data area 211 in the deactivated state.

Thereafter, the first data area 211 may be also activated according to a change in the system temperature.

Figure 7:
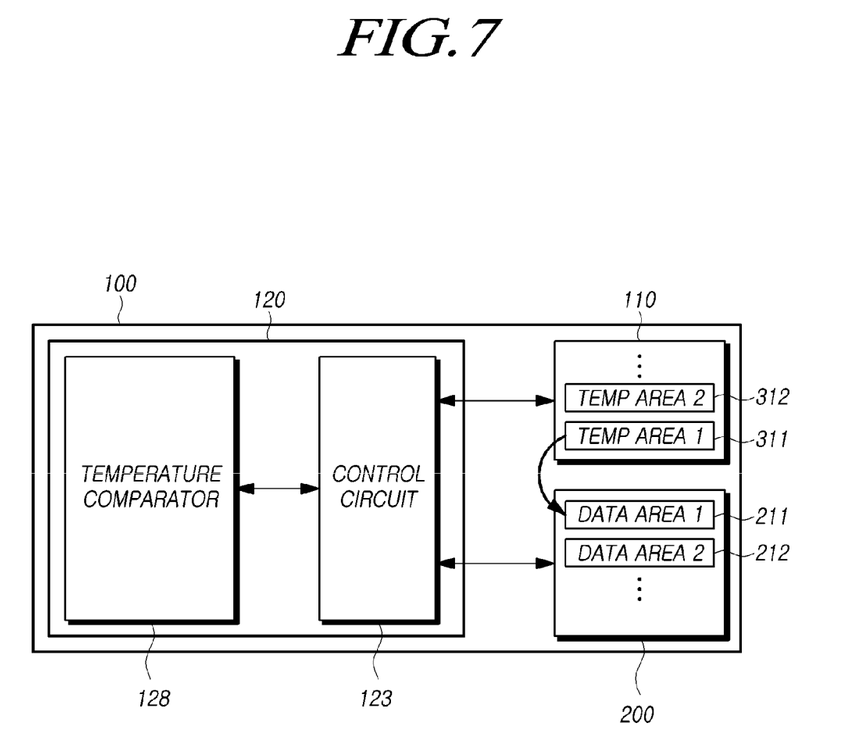

Referring to FIG. 7, when the system temperature becomes lower than the first threshold temperature, the control circuit 123 may also activate the first data area 211 of the volatile memory 200. Thus, data can be stored in the first data area 211, and a refresh operation may be periodically performed on the first data area 211.

As the case may be, the control circuit 123 may migrate the data stored in the first temporary area 311 of the memory 110 to the first data area 211.

According to the embodiment of the disclosed technology, since the size of data areas on which a refresh operation is periodically performed is adjusted depending on the system temperature, it is possible to adjust the system temperature and thus prevent the performance or the reliability of the storage device 100 from degrading due to the system temperature.

Figure 8:
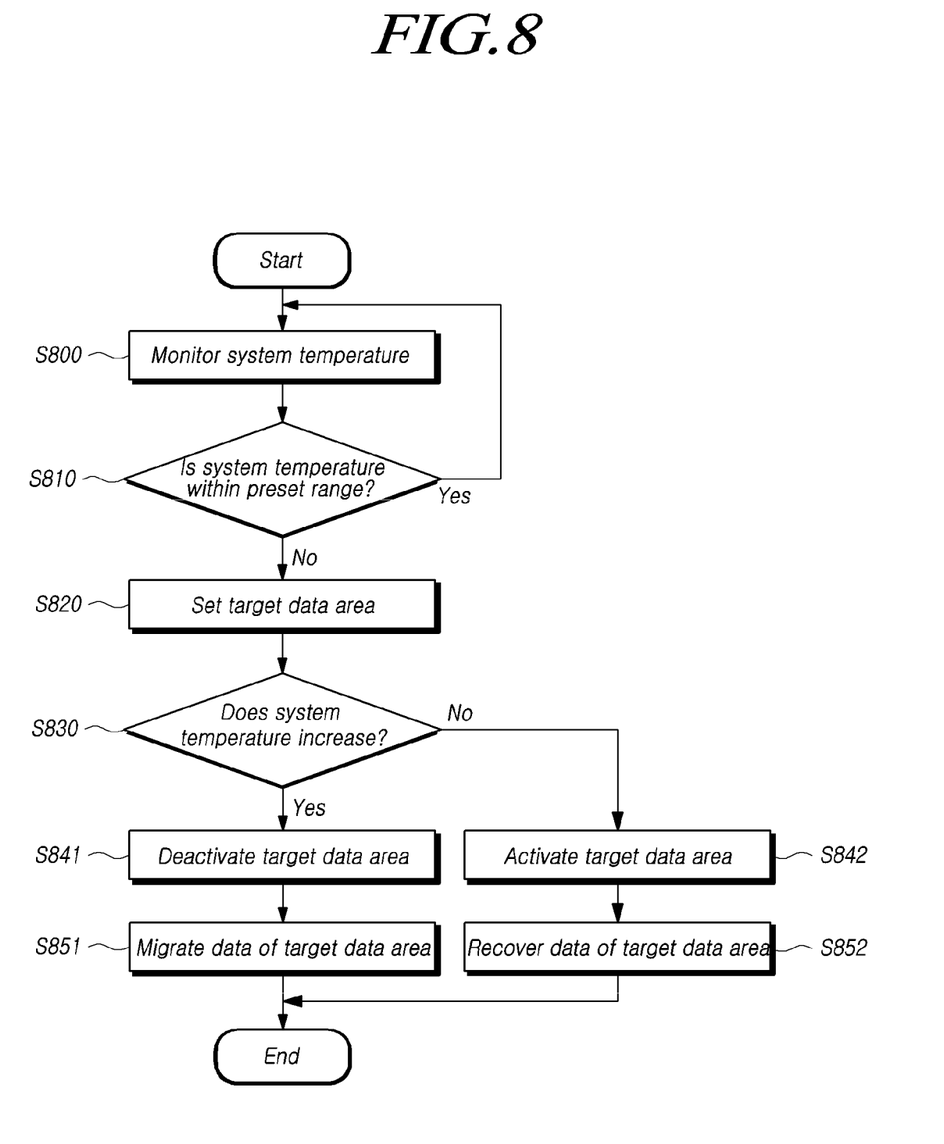
FIGS. 8 to 10 are flowcharts illustrating a method of operating the storage device illustrated in FIG. 2 according to an embodiment of the disclosed technology.
Figure 9:
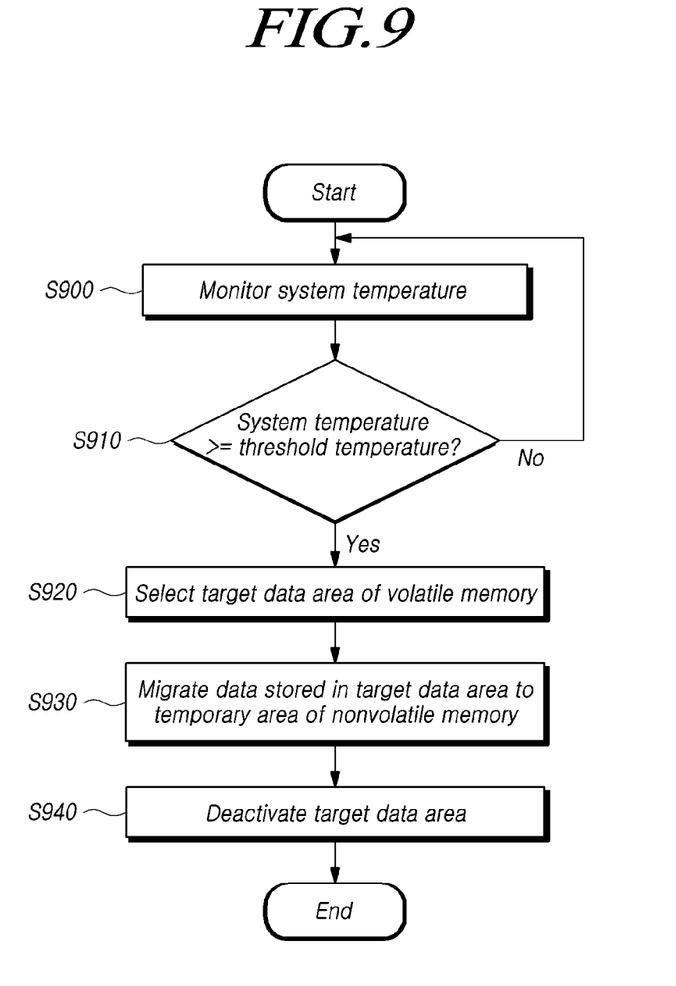
Figure 10:
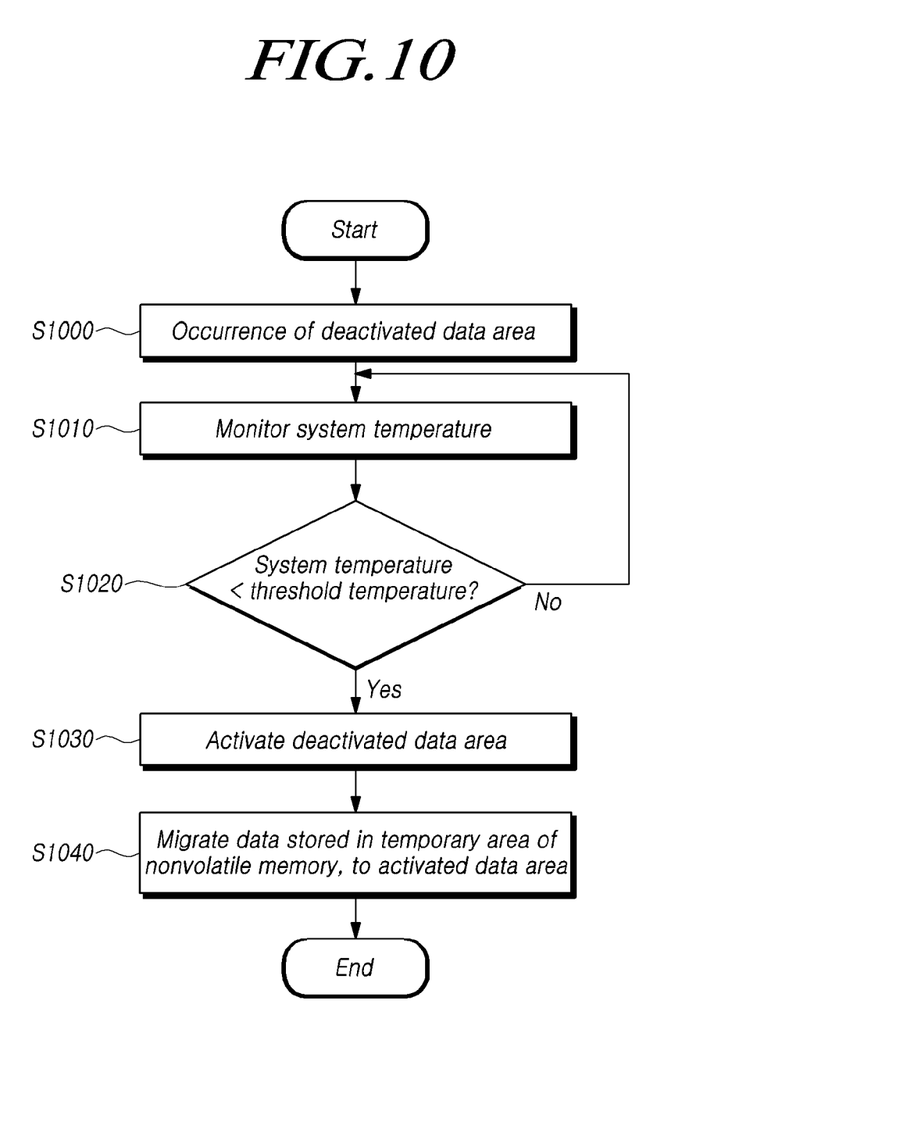

FIGS. 8 to 10 are flowcharts illustrating a method of operating the storage device 100 of FIG. 2 according to an embodiment of the disclosed technology. The method will be described with reference to FIG. 2.

Referring to FIG. 8, the controller 120 may continuously or periodically monitor a system temperature of the storage device 100 (S800).

The controller 120 may check whether the system temperature is within a preset range (S810). The controller 120 may continuously monitor the system temperature to thereby determine whether the system temperature is within the preset range.

When the system temperature is out of the preset range, the controller 120 may set a data area included in the volatile memory 200 as a target data area (S820).

For example, when the system temperature increases beyond the preset range, the controller 120 may set a certain data area in an activated state as the target data area. For another example, when the system temperature decreases to be lower than the preset range, the controller 120 may set a certain data area in a deactivated state as the target data area.

The controller 120 may change the state of the certain data area selected as the target data area according to an increase or a decrease in the system temperature.

For example, the controller 120 may check whether the system temperature increases (S830). When the system temperature increases to be higher than a threshold temperature, the controller 120 may select the certain data area in the activated state as the target data area and change the target data area to a deactivated state (S841). When the system temperature decreases to be lower than the threshold temperature, the controller 120 may select the certain data area in the deactivated state as the target data area and change the target data area to an activated state (S842).

The controller 120 may migrate data related with the target data area whose state is changed, to the memory 110 or to the volatile memory 200.

For example, when the target data area is deactivated, the controller 120 may migrate data stored in the target data area to the memory 110 (S851). When the target data area is activated, the controller 120 may recover data stored in the memory 110 to the target data area in the volatile memory 200 (S852). The data recovered to the target data area may be the data which is previously stored in the target data area and is migrated to and stored in the memory 110 as the target data area is changed from the activated state to the deactivated state.

The controller 120 may stop performing a refresh operation on a deactivated data area in the volatile memory 200, and may perform the refresh operation only on an activated data area. Since the size of data areas on which the refresh operation is performed is adjusted by monitoring the system temperature, when the system temperature increases, it is possible to easily lower the system temperature and maintain the system temperature at an appropriate level.

The method of operating the storage device 100 when the system temperature increases and decreases will be described below.

Referring to FIG. 9, the controller 120 may continuously or periodically monitor the system temperature of the storage device 100 (S900).

The controller 120 may compare the system temperature with a threshold temperature (S910).

When the system temperature is equal to or higher than the threshold temperature, the controller 120 may select, as a target data area, a certain data area in the volatile memory 200 (S920). A data area which stores data having a low use frequency among data areas included in the volatile memory 200 may be selected as the target data area. In the volatile memory 200, the data areas may be physically distinguished from each other, or may be distinguished from each other according to attributes of data stored therein.

The controller 120 may migrate data stored in the target data area to a temporary area of a nonvolatile memory, e.g., the memory 110 (S930).

The controller 120 may deactivate the target data area whose data is migrated to the memory 110 (S940).

When the data area selected as the target data area is deactivated, a refresh operation may not be performed on the deactivated target data area, whereas the refresh operation may be periodically performed on data areas other than the target data area in the volatile memory 200.

After the data area selected as the target data area is deactivated, the controller 120 may increase or decrease the number of deactivated data areas in the volatile memory 200 according to a change in the system temperature.

Referring to FIG. 10, after the certain data area is deactivated (S1000), the controller 120 may continuously or periodically monitor the system temperature of the storage device 100 (S1010).

The controller 120 may compare the system temperature with the threshold temperature (S1020).

When the system temperature is lower than the threshold temperature, the controller 120 may activate the deactivated data area (S1030). Data may be stored in the activated data area, and a refresh operation may be periodically performed on the activated data area again.

As the case may be, the controller 120 may migrate the data, which has been migrated to and stored in the temporary area of the nonvolatile memory 110, to the activated data area (S1040).

By comparing the system temperature with at least two threshold temperatures, the controller 120 may selectively adjust the size of data areas to be deactivated in the volatile memory 200. The controller 120 may delay a certain operation other than the refresh operation depending on the system temperature simultaneously with or separately from deactivating some of data areas in the volatile memory 200.

According to the embodiment of the disclosed technology, the size of data areas on which the refresh operation is performed may be reduced by deactivating some of the data areas of the volatile memory 200 depending on the system temperature.

Since a data area to be deactivated is selected based on the use frequency of stored data, it is possible to prevent an operational abnormality due to deactivation of the data area.

By migrating data stored in the deactivated data area to the nonvolatile memory 110, the corresponding data can be used when it is necessary.

Because the size of data areas on which the refresh operation is performed in the volatile memory 200 is variably adjusted depending on a change in the system temperature, it is possible to control the system temperature and thus prevent the performance and the reliability of the storage device 100 from degrading due to an increase in the system temperature.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
   a nonvolatile memory;
   a volatile memory including a plurality of data areas; and
   a controller configured to, when a system temperature changes from a first temperature to a second temperature higher than the first temperature, migrate data stored in a first data area of the volatile memory to a first temporary area of the nonvolatile memory, which is a different type than the volatile memory, and deactivate the first data area,
   wherein the controller controls a size of the first data area to be deactivated in the volatile memory based on a comparison between the system temperature and at least two threshold temperature values.

2. The storage device according to claim 1, wherein, when the first data area is deactivated, a refresh operation is not performed on the first data area, and the refresh operation is periodically performed on data areas other than the first data area.

3. The storage device according to claim 1, wherein, in the volatile memory, a size of data areas on which a refresh operation is periodically performed when the system temperature is the second temperature is smaller than a size of data areas on which the refresh operation is periodically performed when the system temperature is the first temperature.

4. The storage device according to claim 1, wherein, when the system temperature changes from the second temperature to a third temperature higher than the second temperature, the controller migrates data stored in a second data area of the volatile memory to a second temporary area of the nonvolatile memory and deactivates the second data area in addition to deactivating the first data area.

5. The storage device according to claim 1, wherein, when the system temperature changes from the second temperature to the first temperature, the controller activates the first data area that is in a deactivated state.

6. A storage device comprising:
   a nonvolatile memory;
   a volatile memory including a plurality of data areas; and
   a controller configured to, when a system temperature changes from a first temperature to a second temperature lower than the first temperature, activate a first data area deactivated when the system temperature is the first temperature,
   wherein the controller controls a size of the first data area to be deactivated in the volatile memory based on a comparison between the system temperature and at least two threshold temperature values.

7. The storage device according to claim 6, wherein a refresh operation is periodically performed on the first data area that is activated when the system temperature is changed to the second temperature.

8. The storage device according to claim 6, wherein a refresh operation is not performed on the first data area that is deactivated when the system temperature is the first temperature.

9. The storage device according to claim 6, wherein, in the volatile memory, a size of data areas on which a refresh operation is periodically performed when the system temperature is the first temperature is equal to or smaller than a size of data areas on which the refresh operation is periodically performed when the system temperature is the second temperature.

10. The storage device according to claim 6, wherein the controller migrates data stored in a temporary area of the nonvolatile memory to the first data area that is activated when the system temperature is the second temperature.

11. The storage device according to claim 6, wherein, when the system temperature changes from the second temperature to a third temperature lower than the second temperature, the controller activates at least one of data areas deactivated when the system temperature is the second temperature.

12. A storage device comprising:
    a nonvolatile memory;
    a volatile memory including a plurality of data areas; and
    a controller configured to monitor a system temperature, and set at least one of the plurality of data areas as a target data area and change an activated or deactivated state of the target data area, according to the system temperature,
    wherein the controller controls a size of the target data area to be deactivated in the volatile memory based on a comparison between the system temperature and at least two threshold temperature values.

13. The storage device according to claim 12, wherein, when the system temperature increases to be equal to or higher than a first temperature, the controller sets, as the target data area, at least one of data areas which are in an activated state among the plurality of data areas, and deactivates the target data area.

14. The storage device according to claim 13, wherein, when the target data area is deactivated, the controller stops performing a refresh operation on the target data area.

15. The storage device according to claim 13, wherein, when the target data area is deactivated, the controller migrates data stored in the target data area to the nonvolatile memory.

16. The storage device according to claim 12, wherein, when the system temperature decreases to be lower than a second temperature, the controller sets, as the target data area, at least one of data areas which are in a deactivated state among the plurality of data areas, and activates the target data area.

17. The storage device according to claim 16, wherein, when the target data area is activated, the controller periodically performs a refresh operation on the target data area.

18. The storage device according to claim 12, wherein a size of data areas on which a refresh operation is periodically performed among the plurality of data areas is inversely proportional to the system temperature.

* * * * *